Aug. 14, 1962     H. C. VERNON     3,049,480
METHOD OF OPERATING A HEAVY WATER MODERATED REACTOR
Filed Aug. 29, 1945
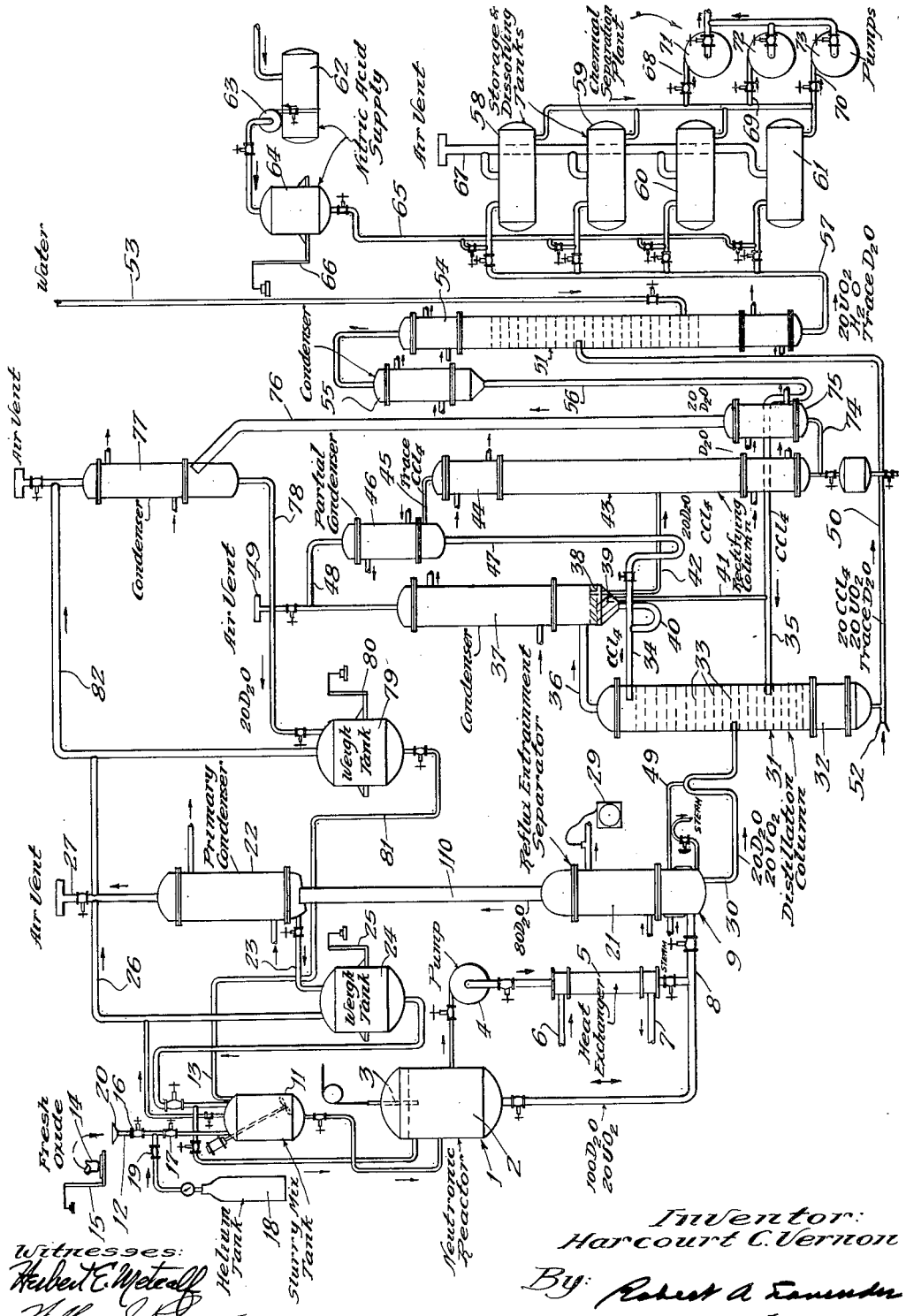
Inventor:
Harcourt C. Vernon United States Patent Office 3,049,480
Patented Aug. 14, 1962

3,049,480
METHOD OF OPERATING A HEAVY WATER MODERATED REACTOR
Harcourt C. Vernon, Oak Ridge, Tenn., assignor to the United States of America as represented by the United States Atomic Energy Commission
Filed Aug. 29, 1945, Ser. No. 613,358
1 Claim. (Cl. 204—154.2)

The present invention relates to a solution, slurry, or other suspension of fissionable material which is suspended in a liquid neutron slowing material or moderator. More specifically, my invention provides a novel apparatus and method for conducting a self-sustaining neutron chain reaction in such a suspension and for separating (after removal of the suspension from the reaction zone) fissionable particles, such as uranium oxide ($UO_2$, $U_3O_8$, or $UO_3$), or equivalent fissionable material from the liquid moderator, such as heavy water (deuterium oxide), in which the particles are suspended, at a relatively rapid rate and under conditions such that little loss of deuterium oxide occurs. It is thus possible, after removal of the uranium or other fissionable solids and fission products from the deuterium oxide to reuse the heavy water and to reduce the total quantity of deuterium oxide required by effecting the recycling thereof within a short time after removal of the suspension from the reactor. It will be understood that the promulgation of a neutronic reaction in such a slurry is not the invention of the present inventor, the matter of obtaining an operative neutronic reaction in such a structure being disclosed in, for example, Patent No. 2,736,696 issued February 28, 1956, to Wigner, Ohlinger, Young and Weinberg, and application Serial No. 613,356, filed August 29, 1945, on behalf of these same inventors.

Natural uranium contains the isotopes $92^{238}$ and $92^{235}$ in the ratio of approximately 139 to 1, and hereinafter in the specification and the claim the term uranium is to be understood as referring to uranium and its chemical composition, of normal isotopic content, unless otherwise indicated by the context.

In a self-sustaining chain reaction of natural uranium with slow neutrons, $92^{238}$ is converted by neutron capture to the uranium isotope $92^{239}$. The latter in turn is converted by beta decay to $93^{239}$ and this $93^{239}$ in turn is converted by beta decay to the transuranic element $94^{239}$. By slow or thermal neutron capture, $92^{235}$ on the other hand, undergoes nuclear fission, releasing energy appearing as heat, gamma and beta radiation, and forming fission fragments appearing as radioactive isotopes of lower mass numbers, as well as releasing secondary neutrons.

The secondary neutrons thus produced by the fissioning of the $92^{235}$ nuclei have a high average energy, and must be slowed down to thermal energies in order to be in condition to cause fission in new $92^{235}$ nuclei. Some of the secondary neutrons are absorbed by uranium leading to the production of $94^{239}$, others are lost either by absorption in other materials forming the reactor, or by leakage from the system. Nevertheless, enough may remain to sustain the chain reaction in a system of sufficient size and that is properly designed to minimize these losses. Based upon the relative concentrations of $92^{235}$ and $92^{238}$ and their relative absorption for neutrons, over half of the remaining neutrons will be absorbed in $92^{235}$ to cause fission and most of those left will be absorbed by $92^{238}$ leading to the formation of $94^{239}$.

Under these conditions the chain reaction will not only supply the neutrons necessary for a self-sustaining neutronic reaction, but will also supply neutrons for capture by the isotope $92^{238}$ leading to the production of $94^{239}$.

As $94^{239}$ is a transuranic element, it can be separated from the unconverted uranium by chemical methods, and as it is fissionable in a manner similar to the isotope $92^{235}$, is valuable for enriching natural uranium for use in other chain reacting systems of smaller overall size. Furthermore, the fission fragments are useful in the field of medicine, being efficient biological tracer elements, as they are radioactive.

The neutronic chain reaction referred to can be made self-sustaining in a device known as a neutronic reactor wherein uranium bodies are dispersed in an efficient neutron slowing medium or moderator, when the reactor is made to be somewhat larger than critical size, that is, the size whereby the rate of neutron generation inside the reactor is equal to the rate of neutron loss in the interior of and from the exterior of the reactor. Uranium oxide particles suspended in a heavy water moderator, in a tank of approximately spherical shape, will maintain a reaction with about 30 to 40 tons of deuterium oxide and about 6 tons of uranium as uranium oxide. Under these conditions, a self-sustaining nuclear chain reaction can be obtained within the reactor having any neutron density desired, within reasonable limits. To prevent destruction of the reactor, the heat generated during the reaction must be removed in an amount providing thermal equilibrium in the reactor at some predetermined and controlled temperature level. After the reaction has proceeded for a substantial period it is desirable to remove the suspended or dissolved solids from the solution or slurry in order to separate fission products and $94^{239}$ from the irradiated fissionable material.

An object of my invention is to provide a new and efficient apparatus and method of separating uranium or other fissionable particles from a heavy water ($D_2O$) moderator in which the particles are in suspension, after being irradiated in a neutronic reactor, so as to make possible a rapid return of $D_2O$ to the reaction and to avoid substantial loss of $D_2O$.

A further object of my invention is to provide an efficient and novel method and system for separating irradiated uranium oxide particles from heavy water without allowing the particles to become dry in the form of a cake that would be difficult to process.

A further specific object of my invention is to provide a new and effective method of separating solids from liquid suspensions thereof.

A still further object of my invention is to provide a new neutronic reactor system for conducting a neutron reaction using as the fissionable component a suspension of a fissionable material in a moderator such as heavy water ($D_2O$).

Other objects and advantages will become more apparent from the following description taken together with the drawing in which the FIGURE is a schematic diagram showing one form of apparatus for effecting separation and recycling of heavy water of a neutron reacting slurry including solid particles fissionable by slow neutrons.

In accordance with the present invention an effective separation of the fissionable composition from a neutron chain reacting slurry or other dispersion may be secured by a two step process. The slurry or other dispersion is withdrawn from the reactor and is partially evaporated to permit partial removal of $D_2O$ and return of the recovered $D_2O$ to the system within a short time, for example 10–60 minutes. Evaporation is discontinued while substantial $D_2O$ remains since handling of the radioactive solids for complete removal of $D_2O$ is quite difficult. Following this the mud or other suspension so obtained is mixed with a water-immiscible volatile liquid and the mixture distilled to drive off water and leave the solids suspended in the water-immiscible liquid.

In accordance with a particularly effective modification of the invention the suspension is introduced into an intermediate portion of a multiple plate or packed distillation column and the water therein is distilled off within the presence of a volatile water immiscible liquid which may have a boiling point above or below that of water. The column is operated at a high reflux so that heavy water is steam distilled from the top of the column and the water immiscible liquid flows down the column and washes the solid to the bottom of the column.

Referring to the drawing, numeral 1 denotes a container or neutronic reactor tank within which the neutronic reaction is caused to occur and that is partially filled with a slurry 2 of uranium oxide or other suitable fissionable particles. The size of the uranium oxide particles is preferably of the order of 2 microns or slightly below to reduce erosion in pumps and other parts of the system, and to reduce poisoning of the system by iron particles and other neutron absorbing materials otherwise abraded from internal surfaces forming the system. One or more rods 3 of neutron absorbing material such as, for example, boron or cadmium may be dipped into and out of the slurry 2 by any suitable control means (not shown) either manual, or automatically responsive to neutron density as denoted by an ion chamber of any well known type located near the periphery of the neutronic reactor tank 1 to control the neutron density and neutron reproduction ratio of the system by absorbing sufficient neutrons from the chain to control the reproduction ratio in the reactor and while operating to maintain that ratio at an average of unity. As an emergency means for stopping the chain reaction the slurry 2 may be dumped into any suitable reservoir at a lower elevation, such as primary evaporator 9 positioned at a lower elevation than tank 1. Slurry 2 may be pumped through a circulating system by use of a pump or other circulating means 4 for the purpose of cooling the slurry. The circulating system is provided with a suitable cooling means such as, for example, a heat exchanger 5, in which cooling water may be made to flow as shown by the inlet 6 and outlet 7. Outlet piping 8 is provided for the purpose of withdrawing the slurry from tank 1 and conducting it to a primary evaporator 9. The evaporator 9 may be provided with a conventional heater or steam jacket for aiding the quick evaporation of a large part of the heated water.

After the contents of tank 1 are allowed to flow into primary evaporator 9, the tank 1 may be refilled by fresh slurry stored in a slurry mix tank 11 into which is fed uranium oxide particles, through the oxide inlet pipe 12, and heavy water, through heavy water inlet pipes 13. Numeral 14 denotes a supply of fresh uranium oxide, portions of which may be weighed by a scale schematically indicated by numeral 15. In order to avoid backing up of helium from the system a pair of valves 16 and 17 are provided in the oxide inlet pipe 12. A supply of helium, such as contained in a pressure tank 18, may be introduced by opening valve 19.

When it is desired to introduce a fresh charge of uranium oxide, valve 16 is opened and valves 17 and 19 are closed and the oxide is then introduced through a funnel 20 to fill the portion of pipe 12 located above valve 17. After this portion is filled, valve 16 is closed and valve 19 opened so as to build up sufficient helium pressure from tank 18 so that upon subsequent opening of valve 17 the uranium oxide particles will be forced downwardly into tank 11 which serves as a slurry mix tank in which the deuterium oxide and oxide are mixed.

Normally the top of tank 1 is charged with helium gas. Helium is inert and has negligible absorption for neutrons. A suitable recombining and recondensing system (not shown) such as a hot grid or platinum-charcoal catalyst followed by a condenser may be used to recombine and recondense the dissociated $D_2$ and $O_2$ gases formed at the top of tank 1.

After the contents of tank 1 are allowed to flow into the primary evaporator 9, the heat applied to the evaporator together with the self heat developed by the radioactive gamma and beta decay of the irradiated oxide particles will cause evaporation of the heavy water. It is desirable to evaporate roughly 80 percent of the heavy water in evaporator 9 to reduce the hold-up of heavy water and permit ready return of most of the heavy water to the system within a minimum of time. The vaporized heavy water will first pass through a reflux entrainment separator 21. This separator is, in effect, a fluid cooled condenser for refluxing the vaporized medium so as to more effectively separate the heavy water from the uranium oxide particles. The vaporized heavy water will travel through separator 21 (diagrammatically illustrated above evaporator 9) and piping 110 and will be condensed in the primary condenser 22. After condensation, the heavy water will be conducted through pipe 23 to a primary return weighing tank 24, disposed on a scale 25. A vent pipe 26 is provided to interconnect the top portion of the tank 24 and primary condenser 22 to equalize their pressures and allow gravity flow of heavy water from condenser 22 to tank 24 at a lower elevation. An additional vent pipe 27 opens to the atmosphere. A weighing scale (not shown) may also be provided for primary evaporator 9 for the purpose of determining the amount of heavy water evaporated as well as the amount of slurry introduced. A temperature indicating instrument of any well known type, denoted schematically by block diagram 29, is provided to indicate the temperature of the coolant in the coolant outlet in the upper portion of the reflux entrainment separator 21. The operation of the separator may be controlled in accordance with the observed temperature as will be apparent to those skilled in the art.

Due to the period of time the slurry remains in the primary evaporator a substantial portion of the radioactive decay of the fission products of short half-life will occur before the irradiated particles reach the secondary evaporator. During this hold-up time, which may last for a period of 5 to 10 minutes or more, emission of delayed neutrons in the irradiated solid will have substantially ceased. Therefore, the secondary evaporator will not be subjected to the action of delayed neutrons and the materials of this evaporator will not become radioactive by neutron absorption and will, for this reason, be accessible when empty and clean for repairs or the like. This is generally not the case for the primary evaporator, inasmuch as the walls of the primary evaporator become radioactive when bombarded by the delayed neutrons. Consequently even when empty and clean this induced radioactivity must be allowed to decay for considerable time before the evaporator can be safely approached by operating personnel.

The heavy water, as a result of the above-described evaporation process, undergoes a purification by distillation that removes non-volatile products of corrosion or fission that might otherwise interfere with the operation of the neutronic reactor.

The operation of the system will be better understood by assuming a specific slurry composition and following through the successive steps of the separation and recovery process. It should be noted that the specific proportions assumed are exemplary only and not limiting insofar as the present invention is concerned, because other proportions may be satisfactorily used instead. Assume that the slurry from neutronic reactor tank 1 comprises 100 parts by weight of heavy water to 20 parts by weight of uranium oxide ($UO_2$) particles. As the result of the evaporation process in primary evaporator 9 about 80 parts of the heavy water may be vaporized, condensed and returned to the neutronic reactor tank via tank 24 and the remaining 20 parts of heavy water plus the 20 parts of oxide particles will be conducted through pipe 30 to a sieve plate distillation column 31. This pipe is constructed to provide a trap in the line to which is connected a return line 49 which enters the evaporator above the liquid level. The distillation column is of usual construction for example a plate, bubble cap or packed column. For example the column may comprise a heater unit or evaporator 32 at the bottom thereof, and a plurality of parallel, perforated plates 33 arranged in the usual manner. A liquid that is immiscible with water, such as, for example, carbon tetrachloride, benzene, toluene, tetrachloroethylene, trichloroethylene or other organic liquid, is introduced through pipes 34 and 35 for the purpose of effecting a "steam distillation" of the heavy water that leaves the top of the column along with the vapor formed by such immiscible liquids. The total vapor pressure of the liquid mixture is substantially the sum of the vapor pressures of each of the liquids comprising it as well known in the art of steam distillation. The column is operated at a high reflux rate so that the immiscible liquid is condensed in the condensers 37 and 46 and returned after separation of the water therefrom to the upper portion of the column. In such a case the refluxing immiscible liquid flowing downwardly in the column washes solid uranium oxide particles toward the bottom of the column. Assuming that carbon tetrachloride is used, some of the carbon tetrachloride vapor, together with some heavy water vapor, will leave the top of the column and will be conducted by pipe 36 to a condenser 37, whereby both liquids are condensed and allowed to settle and separate by virtue of their different specific gravities, forming separate layers 38 and 39 of heavy water and carbon tetrachloride, respectively. The carbon tetrachloride layer drains through pipes 40 and 41 into the column through pipes 34 and 35, respectively, described hereinbefore. The heavy water layer 38 containing but a trace of carbon tetrachloride is introduced by pipe 42 into rectifying column 43 wherein substantially all the carbon tetrachloride is separated. The carbon tetrachloride, having a lower boiling point than heavy water, is removed by fractionation and vapors thereof are allowed to go through a partial reflux condenser 44 at the top of the column and to flow upwardly through pipe 45 into a condenser 46 wherein the carbon tetrachloride vapor is condensed and fed through pipe 47 to the aforementioned pipe 34. The pressures at the tops of condensers 37 and 46 are equalized by the interconnecting pipe 48 which may, in turn, be vented to the atmosphere through a vent 49. In this manner gravity flow of the condensed carbon tetrachloride from tank 46 to pipe 34 will be permitted.

The purified heavy water that collects at the bottom of column 43 flows by gravity or is transferred by suitable means through pipe 74 to a secondary evaporator 75 wherein the heavy water is distilled and vapors thereof allowed to flow through pipe 76 to condenser 77. The heavy water is condensed in condenser 77 and conducted via pipe 78 to a weigh tank 79. A scale 80 is provided to weigh the amount of heavy water contained in tank 79 that is ultimately fed through pipe 81 to a slurry mix tank 11 for storing the heavy water for reuse in neutronic reactor tank 1. The pressures in tanks 79 and 77 are equalized by the inter-connecting pipe 82 that is vented to atmospheric pressure as shown.

At the bottom of distillation column 31 there is collected a suspension of uranium oxide particles, and liquid carbon tetrachloride (usually in equal parts by weight) and traces of heavy water. This suspension is conducted through pipe 50 and introduced into a second sieve plate distillation column 51. Steam is introduced through a steam injector 52 to lift the slurry contained in pipe 50 into the secondary sieve plate column 51. Ordinary water is introduced from any suitable source (not shown) through pipe 53 into column 51 so as, together with the steam, to replace the carbon tetrachloride component of the slurry introduced through pipe 50, in a manner similar to that described in connection with distillation column 31. The carbon tetrachloride component of the upward flowing vapor mixture will pass through reflux condenser 54 into the total condenser 55 that effects total condensation thereof and return of the carbon tetrachloride through pipes 56 and 35, respectively for reuse in column 31 or for storage. In this column water is refluxed by condensation in the upper portion of the column and in the condenser 54 so that the solids are washed to the bottom of the column. The uranium oxide particles and ordinary water together with a trace of heavy water is collected at the bottom of the column 51 and conducted by pipe 57 into a plurality of storage-and-dissolving tanks 58, 59, 60, and 61. A suitable solvent such as nitric acid, stored in storage tank 62 and pumped by pump 63 into a secondary storage tank 64, is introduced to the respective storage tanks 58, 59, 60, and 61 through the feed pipe 65. Weighed quantities of nitric acid may be introduced by the use of scale 66 that weighs the contents of tank 64. The nitric acid will dissolve the uranium oxide particles. The gases formed are allowed to escape through the vent pipe system 67 that interconnects the various storage tanks, and allows the gases to escape through a vent to the atmosphere. The solution formed by the dissolved uranium oxide particles and the nitric acid is conducted through pipes 68, 69, and 70, and by means of pumps 71, 72, and 73, respectively, the solution is pumped into a chemical separation plant (not shown) for further processing and recovery of the desired component of the solution. For example, the isotope $94^{239}$ present in the irradiated uranium oxide component as a result of bombardment by slow neutrons in the neutronic reactor 1, may be extracted and recovered by any suitable chemical method of separation well known in the art forming no part of the present invention. Generally, such method may comprise the isolation of $94^{239}$ from the other materials of the solution by virtue of the different solubility characteristics of $94^{239}$ in different oxidation states. It should be noted, however, that materials other than $94^{239}$ such as, for example, the longer-lived radioactive fission products, may also be separated, if so desired.

The process is capable of numerous variations. For example instead of using carbon tetrachloride an immiscible liquid which boils at a temperature above water such as tetrachloroethylene may be used. In such a case refluxing of the tetrachloroethylene takes place by condensation of this liquid in the upper portion of the column 31 as well as in condenser 37.

Various suspensions of solid fissionable bodies containing $U^{233}$, $U^{235}$, $94^{239}$ or other fissionable material may be used. For example other uranium compounds such as bismuth uranate ($Bi_2O_3.UO_3$) may be used as well as compositions such as uranyl sulphate containing more than natural concentrations of a fissionable material. Moreover the separation method herein described for separating uranium solids from an aqueous medium may be applied generally to separation of other solids such as metal oxides, hydroxides, carbonates etc. from aqueous or other media.

Likewise, other modifications will be apparent to those skilled in the art as a result of the teachings of my invention. For this reason, the invention should not be restricted except insofar as set forth in the following claim.

I claim:

In a method of operating a neutronic reactor containing a slurry of solid particles that are fissionable by slow neutrons dispersed in heavy water, in which buildup of fission products in the slurry interferes with operation of the reactor, the improvement comprising introducing said slurry into an intermediate section of a sieve plate distillation column, steam distilling said slurry by introducing carbon tetrachloride into said column while maintaining the temperature in the column at a temperature such that at least a portion of the heavy water and of the carbon tetrachloride is vaporized and at least a portion of the reflux liquid flows to the bottom of the column, removing said vapor from the top of said column, condensing said vapor and separating the heavy water portion of said condensate from the carbon tetrachloride portion thereof, returning the carbon tetrachloride condensate to a plurality of points at different elevations of said column to effect refluxing so as to aid in depositing the slurry particles at the bottom of said column with said carbon tetrachloride reflux, purifying the heavy water portion of the condensate by distilling the carbon tetrachloride therefrom in one distillation column, evaporating the heavy water in another column, condensing the heavy water and returning to the neutronic reactor.

References Cited in the file of this patent

UNITED STATES PATENTS

| | | |
|---|---|---|
| 1,791,906 | Savage | Feb. 10, 1931 |
| 1,861,841 | Clarke et al. | June 7, 1932 |
| 2,097,769 | Mitscherling | Nov. 2, 1937 |
| 2,138,048 | Vesce | Nov. 29, 1938 |
| 2,138,049 | Vesce | Nov. 29, 1938 |
| 2,152,716 | Van Wirt et al. | Apr. 14, 1939 |
| 2,265,762 | McKittrick et al. | Dec. 9, 1941 |

FOREIGN PATENTS

| | | |
|---|---|---|
| 114,150 | Australia | May 2, 1940 |
| 233,011 | Switzerland | Oct. 2, 1944 |

OTHER REFERENCES

Jones et al.: The Analyst, vol. 52, pp. 383–387 (1927).

A General Account of the Development of Methods of Using Atomic Energy for Military Purposes, 1940–45, by H. D. Smyth. For sale by Supt. of Documents, Washington, D.C., pages 22–28, 40–44, 177.

MDDC–893, United States Atomic Energy Commission. Factors Involved in the Production of Atomic Power, by Farrington Daniels, date declassified April 7, 1947. Pages 3, 5, 6, 7, 8, 9, 10, 11.

Goodman, Clark: The Science and Engineering of Nuclear Power, vol. 1, Addison-Wesley Press, Cambridge, Mass., 1947, pages 275, 303–309.

Harwell, the British Atomic Energy Research Establishment 1946–1951, published in London, 1952, pages 39–42.

July 1954, A Forum Report, Nuclear Reactor Development, Atomic Industrial Forum, New York 16, New York, page 18.